(12) United States Patent
Xu et al.

(10) Patent No.: US 10,161,078 B2
(45) Date of Patent: Dec. 25, 2018

(54) CONTROL METHOD FOR LAUNDRY DRYER

(71) Applicants: HAIER GROUP CORPORATION, Qingdao, Shandong (CN); QINGDAO HAIER WASHING MACHINE CO., LTD., Qingdao, Shandong (CN)

(72) Inventors: Sheng Xu, Shandong (CN); Huacheng Song, Shandong (CN); Shujun Tian, Shandong (CN); Shiqiang Shan, Shandong (CN)

(73) Assignees: HAIER GROUP CORPORATION, Qingdao, Shandong (CN); QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 629 days.

(21) Appl. No.: 14/921,580

(22) Filed: Oct. 23, 2015

(65) Prior Publication Data

US 2016/0040350 A1 Feb. 11, 2016

Related U.S. Application Data

(63) Continuation of application No. PCT/CN2013/089855, filed on Dec. 18, 2013.

(30) Foreign Application Priority Data

Apr. 24, 2013 (CN) .......................... 2013 1 0145237

(51) Int. Cl.
*F26B 3/00* (2006.01)
*D06F 58/28* (2006.01)
*D06F 58/20* (2006.01)

(52) U.S. Cl.
CPC ............ *D06F 58/28* (2013.01); *D06F 58/206* (2013.01); *D06F 2058/287* (2013.01);
(Continued)

(58) Field of Classification Search
CPC .................. D06F 58/206; D06F 58/28; D06F 2058/2832; D06F 2058/2829; D06F 2058/2861; D06F 2058/287
(Continued)

(56) References Cited

U.S. PATENT DOCUMENTS

2009/0126423 A1* 5/2009 Bae ........................ D06F 58/203
68/5 C
2009/0172969 A1* 7/2009 Kim ........................ D06F 58/28
34/491

FOREIGN PATENT DOCUMENTS

CN 1626724 A 6/2005
CN 1936160 A 3/2007
(Continued)

OTHER PUBLICATIONS

State Intellectual Property Office of the P.R. China (ISR/CN), "International Search Report for PCT/CN2013/089855", China, dated Mar. 27, 2014.

*Primary Examiner* — Kenneth Rinehart
*Assistant Examiner* — Bao D Nguyen
(74) *Attorney, Agent, or Firm* — Locke Lord LLP; Tim Tingkang Xia, Esq.

(57) ABSTRACT

The present invention relates to a control method for a laundry dryer. The laundry dryer is a heat-pump type laundry dryer and a compressor of the laundry dryer is a variable-frequency compressor. The control method includes setting a minimum running frequency of the compressor according to an amount of clothes to be dried, where the more the clothes are, the larger the set minimum running frequency is. Specifically, when laundry drying is started, the amount of the clothes being dried is detected. According to the detected information, a minimum running frequency of the compressor, corresponding to the information, is
(Continued)

invoked, and the minimum running frequency of the compressor in the current laundry drying process is set.

9 Claims, 5 Drawing Sheets

(52) U.S. Cl.
CPC ............... *D06F 2058/2829* (2013.01); *D06F 2058/2832* (2013.01); *D06F 2058/2861* (2013.01)

(58) Field of Classification Search
USPC .......................................................... 34/443
See application file for complete search history.

(56) References Cited

FOREIGN PATENT DOCUMENTS

| | | | | |
|---|---|---|---|---|
| CN | 101581024 | A | 11/2009 | |
| CN | 201864982 | U | 6/2011 | |
| CN | 102206916 | A | 10/2011 | |
| EP | 2735642 | A1 * | 5/2014 | ............. D06F 58/28 |
| JP | 2013081638 | A * | 5/2013 | |

\* cited by examiner

CONTROL METHOD FOR LAUNDRY DRYER

CROSS-REFERENCE TO RELATED APPLICATIONS

This application is a continuation application of International Patent Application No. PCT/CN2013/089855, filed Dec. 18, 2013, which itself claims the priority to Chinese Patent Application No. 201310145237.4, filed Apr. 24, 2013 in the State Intellectual Property Office of P.R. China, which are hereby incorporated herein in their entireties by reference.

FIELD OF THE INVENTION

The present invention relates to the field of washing machines, specifically, to a control method for a compressor of a heat-pump laundry dryer, and more particularly, to a method for controlling frequency of a compressor according to an amount of clothes by a laundry dryer.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

An existing heat-pump type of laundry dryers (i.e., laundry dryers) is provided with an air circulation passageway as follows: heated air heated by a condenser in a heat pump circulation system is delivered to a drying chamber having clothes therein, wet air obtained after taking moisture from the clothes is delivered back to an evaporator for dehumidification, and air obtained after dehumidification is again heated by the condenser and is then sent into the drying chamber.

In a drying system of a heat-pump laundry dryer, tolerant pressure of a compressor system is saturation pressure of a refrigerant at a temperature between 60 to 70° C. At a drying post stage, a condensing temperature of the compressor approaches a limit value of peak pressure with increase of temperature. An existing drum-type, heat-pump laundry dryer is designed with an auxiliary condenser and an auxiliary fan, so to assist an operation of a fan at a drying post stage or in a high-temperature environment, for regulating a load of a compressor.

Chinese Patent Application No. 200610153406.9 discloses a laundry dryer capable of enabling a heat pump that generates drying air circulated between a drying chamber and the heat pump to operate stably. Air heated by a heater in the heat pump is delivered to a water barrel used as the drying chamber. Air discharged from the water barrel returns back to the heat pump after passing through a filter unit, and is then dehumidified by a heat absorber and again delivered to the heater to form an air circulation passageway. The filter unit is provided with a lint filter, and is provided with a duct communicating with an air outlet and an air inlet.

Chinese Patent Application No. 200410097855.7 discloses a laundry dryer including: a heat pump device; an air path for guiding drying air into a heat absorber and a heat radiator of the heat pump device and a drying chamber having therein clothes; a blower for blowing the drying air to the air path; and a control device. In a process of drying clothes, a compressor and a blower operate. If the process of drying clothes is interrupted, the control device stops the compressor for a prescribed time.

For the above heat pump drying type of the laundry dryer, in an environment with a high temperature, for example, in an environment with a temperature between 35 to 40° C., the temperature of air that blows into a washing/drying barrel rapidly increases to above 60° C. at a drying start stage, and the temperature and humidity of air that blows out from the washing/drying barrel also increase rapidly. In this situation, saturation pressure of a refrigerant in an evaporator is high, a load of a compressor system is great, and a critical working pressure of the compressor is reached rapidly.

For a laundry dryer using a variable-frequency compressor system, although working frequency of a compressor may be adjusted by a control system for the compressor for regulating a working load of the compressor and running frequency of the compressor may be reduced along with an increase in temperature in a barrel to save power consumption, a lowest working frequency of the variable-frequency compressor in the existing laundry dryer is a preset value within a range that the compressor permits and when the temperature in the barrel increases and it is necessary to further reduce the running frequency, the running frequency cannot be further reduced after the preset lowest value is reached.

When there is a small amount of clothes in a drum, the volume occupied by the clothes occupy is small; for the compressor to achieve a same condenser surface temperature, that is, for a same cylinder intake temperature, a circulated air volume becomes larger since a blocking effect of the clothes is small, a cylinder outlet temperature is higher than that of clothes of a large volume, and an average temperature in the whole drying barrel is high. Moreover, the clothes are relatively loose when the occupied volume is small, and moisture in the clothes can easily evaporate. When there is a larger amount of clothes in the drum, the volume occupied by the clothes is large; for the compressor to achieve a condenser surface temperature the same as the above condenser surface temperature for drying the small amount of clothes, that is, for a same cylinder intake temperature, a circulated air volume becomes smaller since a blocking effect of the clothes is great, a cylinder outlet temperature is lower than that of the clothes of the small volume, and an average temperature in the whole drying barrel is high. Besides, since there is a large amount of clothes, tightly twined with each other, moisture in the clothes cannot easily evaporate. If a same compressor rotation rate as one for drying clothes of a small volume is used, an average drying time for per unit of weight becomes longer, and average power consumption becomes greater.

Therefore, a heretofore unaddressed need exists in the art to address the aforementioned deficiencies and inadequacies.

SUMMARY OF THE INVENTION

One of the objectives of the present invention is to provide a heat-pump laundry dryer for controlling frequency of a compressor according to an amount of clothes, so as to overcome disadvantages of the existing technology and achieve the reduction of power consumption by adjusting a minimum running frequency of the compressor by determining the amount of clothes in a drum.

In one aspect, the present invention relates to a control method for a laundry dryer. The laundry dryer is a heat-pump type laundry dryer and the compressor is a variable-frequency compressor. In one embodiment, the method includes setting a minimum running frequency of the compressor according to an amount of clothes, where the more the clothes are, the larger the set minimum running frequency is.

In one embodiment, after drying starts, the amount of the clothes is detected and a minimum running frequency of the compressor corresponding to the detected information is set as the minimum running frequency of the compressor in this drying process. In one embodiment, after frequency rising of the compressor ends, the amount of the clothes is again detected to set the minimum running frequency of the compressor.

In one embodiment, within a set range of drying time, a time for a condenser surface temperature to reach a set temperature value is determined, where the longer the time is, the more the clothes are, or a change in a condenser surface temperature within a set period of time is determined, where the smaller the change in the condenser surface temperature for per unit of time is, the more the clothes are, and further the larger the set minimum running frequency of the compressor is.

Alternatively, a substitute solution is: within a set range of drying time, determining a time for humidity of the clothes in the barrel of the laundry dryer to reach a set humidity value, where the longer the time is, the more the clothes are, or determining a change in humidity of the clothes within a set period of time, where the smaller the change in the humidity of the clothes, the more the clothes are, and further the larger the set minimum running frequency of the compressor is.

Alternatively, another substitute solution is: within a set range of drying time, determining a different between a cylinder intake temperature and a cylinder outlet temperature of heated air of the laundry dryer, where the larger the difference is, the more the clothes are, and further the larger the minimum running frequency of the compressor is.

Alternatively, yet another substitute solution is: at the beginning, first detecting a primary weight of the clothes, and after working for a set period of time, again detecting a weight of the clothes after drying, and determining a change in the weight of the clothes per unit of time, where the smaller the change is, the more the clothes are, and further the larger the set minimum running frequency of the compressor is.

With regarding to the method for determining the amount of the clothes in the present invention, the amount of the clothes may also be set by a user according to a quantity of clothes put therein, and a washing machine invokes, according to a clothes amount set by the user, a minimum running frequency of the compressor corresponding to the clothes amount.

In certain embodiments, the laundry dryer provides two or more levels of clothes amount according to the amount of the clothes, and a different level of clothes amount is separately corresponding to a different minimum running frequency of the compressor. For example, when two levels, namely, a large amount of clothes and a small amount of clothes, are provided, the two levels are corresponding to two different minimum running frequencies of the compressor. When three levels, namely, a large amount of clothes, an intermediate amount of clothes, and a small amount of clothes, are provided, the three levels are corresponding to three different minimum running frequencies of the compressor. The laundry dryer may use a minimum running frequency of the compressor corresponding to one of the levels as a default minimum running frequency of the compressor, or may also additionally set another minimum running frequency of the compressor.

The method for determining the minimum running frequency of the compressor may be used as a default drying process of the laundry dryer, or may be used as an additional function that a user may select to use or not to use.

In one embodiment, for a different drying process selected, a set parameter thereof is also different.

In one embodiment, the laundry dryer regulates the frequency of the compressor according to a cylinder intake temperature and/or a cylinder outlet temperature, a temperature detected by one or more temperature sensors disposed on the compressor/an evaporator/a condenser, or a drying time.

When the drying starts, the compressor is controlled to raise the frequency. The frequency rising process may adopt frequency rising in stages, or may adopt an existing compressor frequency rising means, so as to enable the compressor to raise the frequency to a final frequency and run stably. Then, the minimum running frequency of the compressor is set according to the amount of the clothes. After the setting is completed, in a condition that an input current of the variable-frequency compressor, a compressor discharge temperature, or a condenser temperature does not reach an upper limit, the variable-frequency compressor is controlled to raise the final frequency for running for a set period of time or the variable-frequency control of the compressor is entered after the detected temperature reaches a set value. Otherwise, the upper limit is reached, and the variable-frequency control of the compressor is readily entered. The upper limit condition refers to a maximum current that the compressor permits, an allowed maximum value of the compressor discharge temperature, or a maximum value of the condenser temperature that reflects condensing pressure. For a different compressor, the upper limit value is also different.

In addition, on the basis of the above solutions, the frequency rising control of the compressor refers to raising the frequency in stages at a fixed frequency rising speed and entering a next stage after ending each stage of frequency rising and keeping stable for a fixed time, until reaching the final frequency. Preferably, the fixed frequency rising speed is 1 Hz/s to 1 Hz/60 s. The frequency rising speed is associated with a drying parameter of the laundry dryer and a working load of the variable-frequency compressor.

The variable-frequency control of the compressor includes a frequency-down anti-frosting stage and staged frequency control. The frequency-down anti-frosting stage refers to controlling the variable-frequency compressor to reduce the frequency according to a detected temperature in a stage in which the evaporator is apt to frost. The staged frequency control refers to determining, according to a detected temperature, in each stage whether the detected reaches a set temperature of the stage and selecting frequency rising or frequency-down control.

In one embodiment, after the compressor is started and runs stably, if it is detected that the condenser temperature, the cylinder outlet temperature, or the evaporator temperature is below a set value, a difference between the condenser temperature and the compressor discharge temperature is less than a set value, or a difference between an outlet temperature and an inlet temperature of the evaporator is less than a set value, the evaporator is apt to frost, or a liquid refrigerant is apt to be sucked into the compressor. In this case, the variable-frequency compressor is controlled to reduce the frequency in stages. If the evaporator is still in a state of being apt to frost when the frequency is reduced to a set minimum running frequency H2, after a certain period of time, the variable-frequency compressor is controlled to stop running for a set period of time, and a frequency rising process of the compressor is then executed for running at the final frequency.

In one embodiment, the frequency regulation of the compressor adopts staged control, including: dividing running frequency of the compressor into a plurality of stages to establish correspondences with detected temperatures, where the higher the temperature is, the lower the running frequency is controlled to be, detecting, in each stage, whether the temperature reaches a set temperature corresponding to the stage, if the temperature reaches the set temperature corresponding to the stage, adjusting and reducing the frequency according to the running frequency to enter a next stage, if the temperature does not reach the set temperature corresponding to the stage, adjusting the running frequency in the stage to be equal to or larger than the frequency corresponding to the temperature in the stage, and controlling the variable frequency to be equal to or larger than the minimum running frequency.

In another aspect of the present invention, the heat-pump type laundry dryer includes a heat pump drying system. The heat pump drying system includes a heat-pump module provided with a variable-frequency compressor, a condenser, a throttle device, and an evaporator. Alternatively, in one embodiment, the heat pump drying system also includes a fan, configured to reduce a temperature of a surface of the variable-frequency compressor so as to regulate a load. A fan control stage is added between the variable-frequency control of the compressor and determining of ending of the drying. The added fan control stage is the same as an existing fan control process for an invariable-frequency compressor of a heat-pump laundry dryer. If a detected temperature or an input current of a compressor exceeds a set permit value, the fan runs. If the detected or the input value of the compressor is below another value, the fan is turned off. The detected temperature in the process is preferably the compressor discharge temperature or the condenser temperature.

An air flow driven by the fan is applied to a heat exchange area of the variable-frequency compressor. A condenser temperature sensor for detecting a condenser temperature is provided on the condenser at a position near an outlet of a refrigerant, an evaporator air temperature sensor for detecting an evaporator temperature is provided on the evaporator in a direction of an air inlet, or a compressor temperature sensor for detecting a compressor discharge temperature is provided at the air outlet of the variable-frequency compressor, or further, air inlet or outlet temperature sensor for detecting a cylinder intake temperature or a cylinder outlet temperature is provided at an air inlet or an air outlet of a drum.

As compared with the existing technology, the present invention has at least the following beneficial effects.

By the control method for a compressor of a heat-pump laundry dryer of the present invention, when there is a great amount of clothes, the set minimum running frequency of the compressor is increased to increase the drying temperature in the drum, to shorten the drying time, to finally achieve a better drying effect; and when there is a small amount of clothes, since the clothes are loose, moisture inside can easily evaporate, through a comprehensive comparison of power consumption and drying efficiency of the compressor, a smaller minimum running frequency of the compressor can be set, which comparatively reduces power consumption.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings. In accordance with the purposes of this disclosure, as embodied and broadly described herein, this invention, in one aspect, relates to a control method for a compressor of a heat-pump type laundry dryer, and more particularly, to a method for controlling frequency of a compressor according to an amount of clothes in the laundry dryer.

Figure 1:
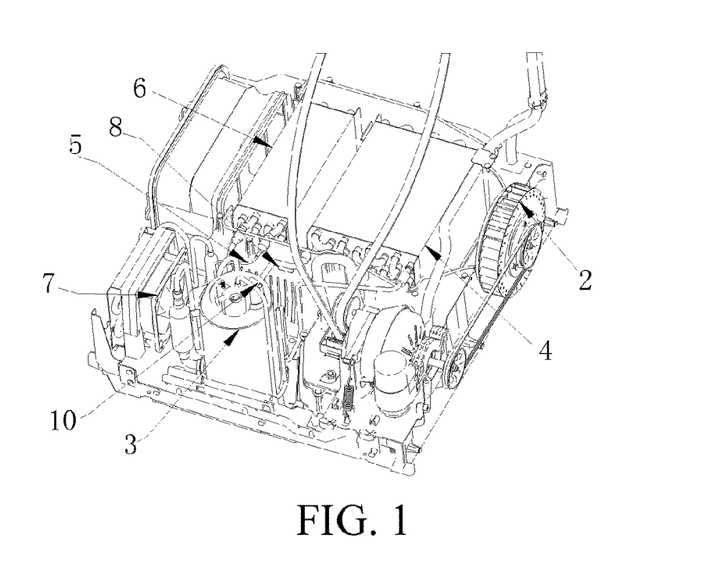
FIG. 1 is a schematic diagram of a heat-pump drying system according to one embodiment of the present invention.
Figure 2:
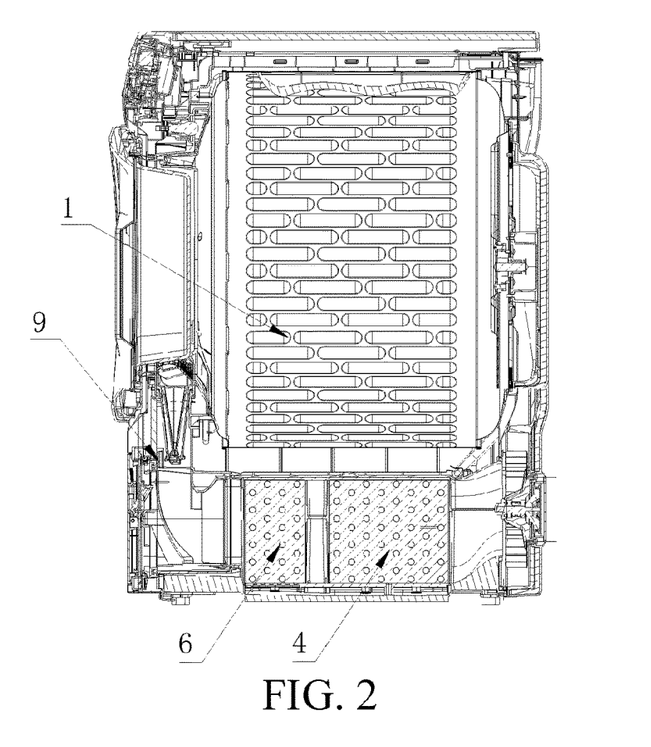
FIG. 2 is a schematic diagram of a heat-pump laundry dryer according to one embodiment of the present invention.

As shown in FIGS. 1 and 2, the heat-pump laundry dryer according to one embodiment of the present invention includes a drum 1 and a heat-pump drying system disposed below the drum. Hot air generated by the heat-pump drying system is guided by an air delivery fan 2 into the drum via a drying air path to dry clothes. The heat-pump drying system includes a heat-pump module provided with a variable-frequency compressor 3, a condenser 4, a throttle device 5, and an evaporator 6, and further includes a fan 7, configured to reduce a temperature of a surface of the variable-frequency compressor 3 so as to regulate a load. An air flow driven by the fan 7 is applied to a heat exchange area of the variable-frequency compressor 3. A condenser temperature sensor 8 for detecting a condenser temperature is provided on the condenser 4 at a position near an outlet of a refrigerant, an evaporator air temperature sensor 9 for detecting an evaporator temperature is provided on the evaporator 6 in a direction of an air inlet, or a compressor temperature sensor 10 for detecting a compressor discharge temperature is provided at the air outlet of the variable-frequency compressor 3, or further, air inlet or outlet temperature sensor (not shown) for detecting a cylinder intake temperature or a cylinder outlet temperature is provided at an air inlet or an air outlet of a drum.

Figure 3:
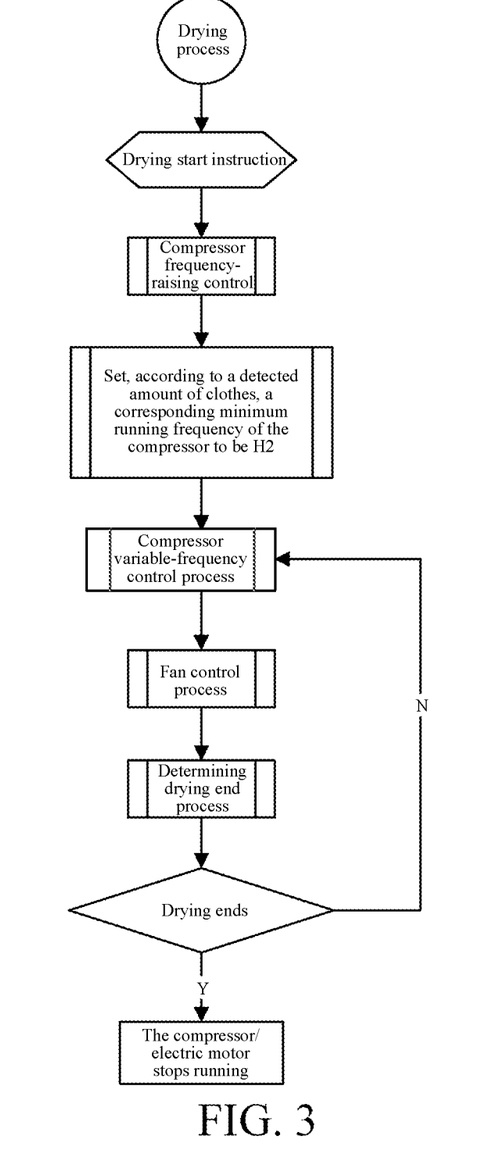
FIG. 3 is a schematic flowchart of drying control for the laundry dryer according to one embodiment of the present invention.

As shown in FIG. 3, a schematic flowchart of drying operation by the heat-pump laundry dryer according to this exemplary embodiment of the present invention is shown. The process includes, from start to end, frequency rising control of the compressor, setting of a minimum running frequency of the compressor according to an amount of clothes, variable-frequency control of the compressor, fan control and determining of drying ending, and if it is detected that a set drying condition is not reached, repeating the process of the variable-frequency control of the compressor, the fan control, and the determining of drying ending. The frequency rising control of the compressor refers to controlling the variable-frequency compressor to raise the frequency to a final frequency H0 and runs stably. The setting of the minimum running frequency of the compressor refers to selecting, by detecting an amount of clothes a minimum running frequency H2 of the compressor corresponding to the clothes amount. The variable-frequency control of the compressor refers to adjusting a running frequency of the variable-frequency compressor in stages corresponding to detected temperatures.

The detecting of the temperature refers to detecting a cylinder intake temperature or a cylinder outlet temperature of the laundry dryer, a compressor discharge temperature, an evaporator temperature, or a condenser temperature. The final frequency H0 is a set target frequency, or, the final frequency H0 is a corresponding frequency when an input current of the variable-frequency compressor, the compressor discharge temperature, or the condenser temperature reaches an upper limit, that is, in the stage in which the variable-frequency compressor controls the frequency to increase, it is needed to monitor a running current I of the compressor, a condenser surface temperature that reflects the condenser temperature, a compressor discharge temperature that reflects an internal temperature of the compressor, an evaporator temperature, or the like. If the monitored parameter reaches a required limit value, the variable-frequency compressor maintains the running frequency at this time as the final frequency H0 and no longer increases the same, even if the running frequency does not increase to the set target frequency.

Without intent to limit the scope of the invention, examples and their related results according to the embodiments of the present invention are given below.

Embodiment 1

Figure 4:
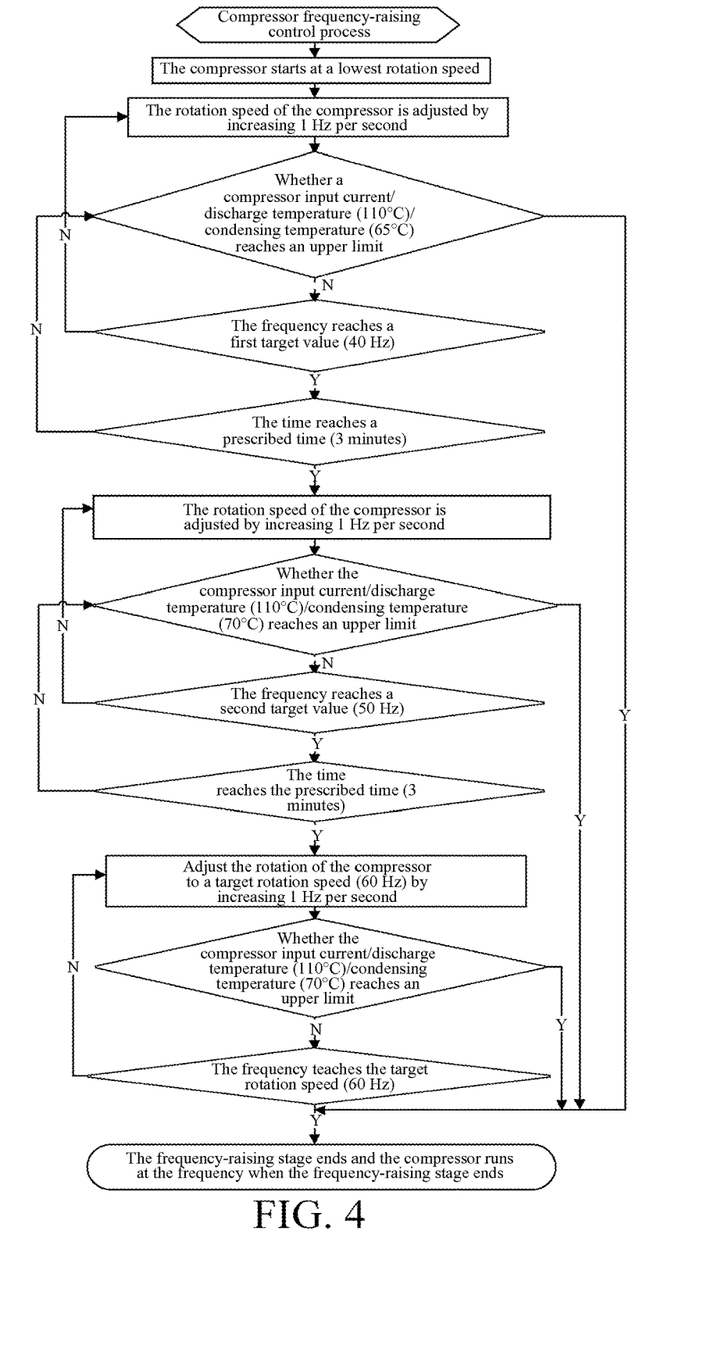
FIG. 4 is a schematic flowchart of frequency rising control for the compressor according to one embodiment of the present invention.

FIG. 4 shows a schematic flowchart of frequency rising control for the compressor according to one embodiment of the present invention. The frequency rising control of the compressor refers to raising the frequency in stages at a fixed frequency rising speed and entering a next stage after ending each stage of frequency rising and keeping stable for a fixed time, until reaching the final frequency. The final frequency is a set frequency, or a running frequency when a condenser temperature/a compressor discharge temperature/an input current of the compressor reaches an upper limit. In each stage, whether the condenser temperature/the compressor discharge temperature/the input current of the compressor corresponding to the running frequency of the compressor reaches the upper limit in the stage needs to be detected. After the variable-frequency compressor is started, the compressor starts running at a low speed and gradually increases the frequency to a final frequency H0, rather than readily run at a highest frequency. The purpose of dividing frequency rising of the compressor into a plurality of stages and running for 0.5 to 3 minutes to be stable after raising the frequency to each stage, the raising speed being 1 Hz/s to 1 Hz/60 s, for example, 28 to 40 Hz, 40 to 50 Hz, and 50 to 60 Hz, rather than readily increase to the highest frequency, is: 1. avoiding the situation in which the oil in the variable-frequency compressor is discharged more than being returned back to the variable-frequency compressor from the heat exchanger, which causes poor lubrication and increases abrasion of parts in the variable-frequency compressor; 2. avoiding the situation in which the refrigerant in the evaporator is not fully evaporated at the beginning, so that the liquid refrigerant enters the compressor and dilutes the lubricating oil in the variable-frequency compressor, which causes poor lubrication.

Specifically, the variable-frequency compressor starts at a lowest rotation speed. The lowest rotation speed is associated with a model and settings of the compressor, and the frequency is first raised at the speed of 1 Hz/s. Whether a compressor input current/discharge temperature/condenser temperature reaches an upper limit is detected, for example, the upper limit of the compressor discharge temperature in this stage is 110° C., the upper limit of the condenser temperature is 65° C., and the upper limit of the input current of the compressor is associated with the compressor model. If the upper limit is reached, the running frequency of the compressor when the upper limit is reached is used as the final frequency. Otherwise, if the upper limit is not reached, the compressor continues raising the frequency at the speed of 1 Hz/s to reach a first target frequency 40 Hz, runs at the frequency for a set time, 3 minutes, and then raises the frequency at the speed of 1 Hz/s to enter a second stage, in which the corresponding upper limit of the compressor discharge temperature is 110° C., the upper limit of the condenser temperature is 70° C., and the target frequency is 50 Hz, and the compressor runs at the frequency 50 Hz for a set time, 3 minutes, and then continues raising the frequency at the speed of 1 Hz/s to enter a third stage, in which the corresponding upper limit of the compressor discharge temperature is 110° C., the upper limit of the condenser temperature is 70° C., and the target frequency is 60 Hz. Since the final frequency of the compressor is 60 Hz, the frequency rising control stage ends after the target frequency is reached. If the target frequency is 70 Hz, running by raising frequency is continued according to the above method. In the above process, after the variable-frequency compressor raises the frequency to the target frequency and runs stably for a period of time, for example, for 3 minutes, the frequency change of the variable-frequency compressor is controlled to form an inverse relationship with the temperature for reflecting drying such as the detected condenser temperature, temperature in the cylinder, or cylinder intake temperature. When the temperature increases, the frequency decreases. The process is performed in each stage accordingly.

The detection of the amount of the clothes of the present invention may adopt the determining methods of Embodiment 2 to Embodiment 6 below, but is not limited to the five methods.

Embodiment 2

In this embodiment, within a set range of drying time, a time for a condenser surface temperature to reach a set temperature value is determined, where the longer the time is, the more the clothes are, or a change in a condenser surface temperature within a set period of time is determined, where the smaller the change in the condenser surface temperature for per unit of time is, the more the clothes are, and further the larger the set minimum running frequency of the compressor is. On the contrary, an opposite situation is provided. For example, within 30 minutes, if the change in the condenser surface temperature is less than 20° C., it is considered that the clothes are more, the minimum running frequency H2 of the compressor is set to be 35 Hz. Within 30 minutes, if the change in the condenser surface temperature is larger than 20° C., it is considered that the clothes are fewer, the set minimum running frequency H2 of the compressor is set to be 30 Hz.

Embodiment 3

Within a set range of drying time, a time for humidity of the clothes in the barrel of the laundry dryer to reach a set humidity value is determined, where the longer the time is, the more the clothes are, or a change in humidity of the clothes within a set period of time is determined, where the smaller the change in the humidity of the clothes, the more the clothes are, and further the larger the set minimum running frequency of the compressor is. For example, within 30 minutes, if the humidity value is larger than 1,900, it is considered that the clothes are more, the minimum running frequency H2 of the compressor is set to be 35 Hz. Within 30 minutes, if the humidity value is less than 1,900, it is considered that the clothes are fewer, the set minimum running frequency H2 of the compressor is set to be 30 Hz.

Embodiment 4

Within a set range of drying time, a different between a cylinder intake temperature and a cylinder outlet temperature of heated air of the laundry dryer is determined, where the larger the difference is, the more the clothes are, and further the larger the minimum running frequency of the compressor is. The reasons are that: when there are more clothes in the drum, a volume occupied by the clothes is large; for the compressor to achieve a same condenser surface temperature, that is, for a same cylinder intake temperature, a circulated air volume becomes smaller since a blocking effect of the clothes is great, a cylinder outlet temperature is lower than that of the clothes of a small volume, and therefore the difference between inlet and outlet cylinder temperatures is large.

Embodiment 5

At the beginning, first a primary weight of the clothes is detected, and after working for a set period of time, the weight of the clothes after drying is detected again, and a change in the weight of the clothes per unit of time is determined, where the smaller the change is, the more the clothes are, and further the larger the set minimum running frequency of the compressor is.

Embodiment 6

With regarding to the method for determining the amount of the clothes in this embodiment, the amount of the clothes is set by a user according to a quantity of clothes put therein, and a washing machine invokes, according to a clothes amount set by the user, a minimum running frequency of the compressor corresponding to the clothes amount.

In the above method for determining the amount of the clothes, the laundry dryer provides two or more levels of clothes amount according to the amount of the clothes, and a different level of clothes amount is separately corresponding to a different minimum running frequency of the compressor. For example, when two levels, namely, a large amount of clothes and a small amount of clothes, are provided, the two levels are corresponding to two different minimum running frequencies of the compressor. When three levels, namely, a large amount of clothes, an intermediate amount of clothes, and a small amount of clothes, are provided, the three levels are corresponding to three different minimum running frequencies of the compressor. The laundry dryer may use a minimum running frequency of the compressor corresponding to one of the levels as a default minimum running frequency of the compressor, or may also additionally set another minimum running frequency of the compressor.

The method for determining the minimum running frequency of the compressor may be used as a default drying process of the laundry dryer, or may be used as an additional function that a user may select to use or not to use.

Further, for a different drying process selected, a set parameter thereof is also different.

Embodiment 7

Figure 5:
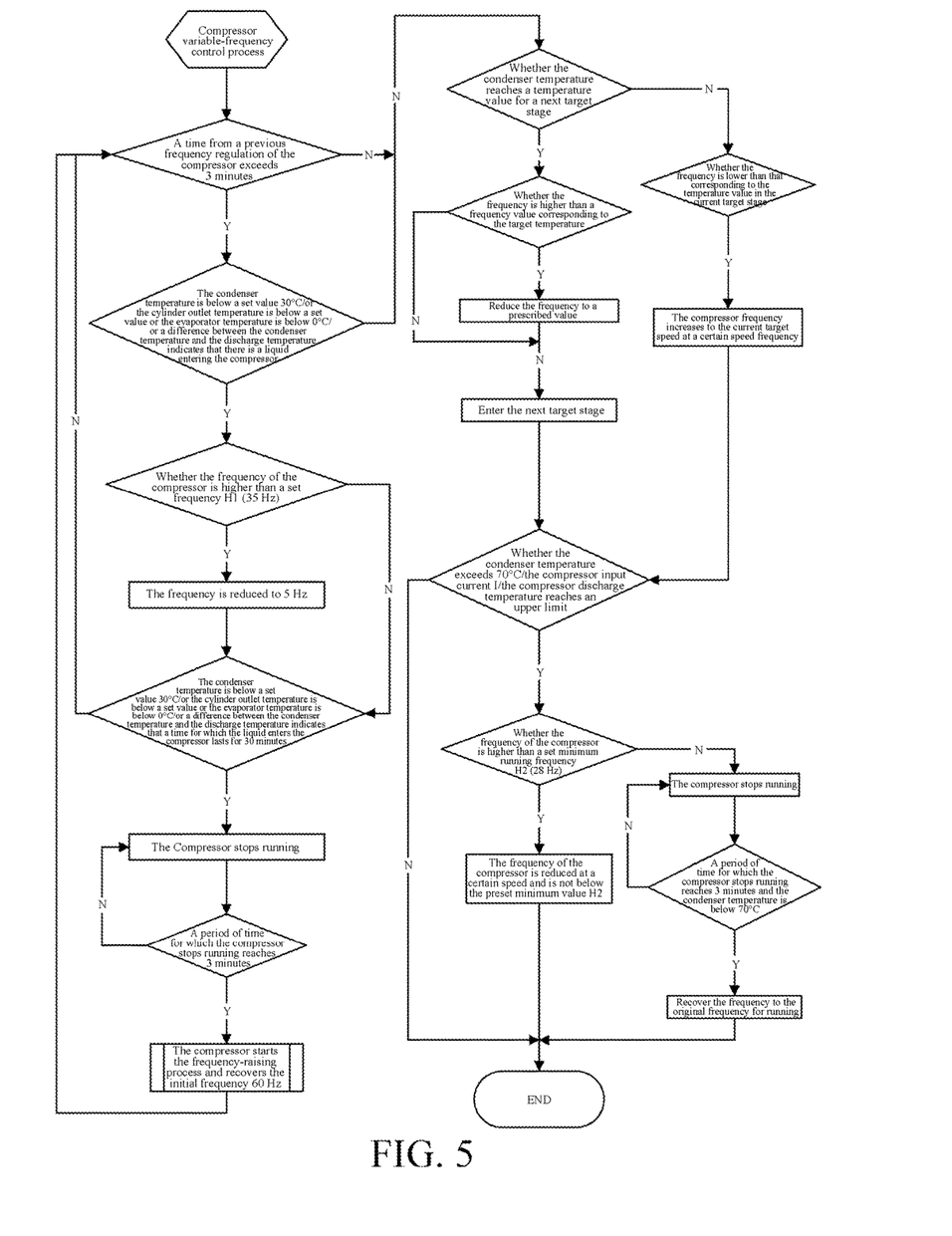
FIG. 5 is a schematic flowchart of variable-frequency control for the compressor according to one embodiment of the present invention.

As shown in FIG. 5, this embodiment is a schematic flowchart of variable-frequency control for the compressor. The variable-frequency control of the compressor includes a frequency-down anti-frosting stage and staged frequency control. The frequency-down anti-frosting stage refers to controlling the variable-frequency compressor to reduce the frequency according to a detected temperature in a stage in which the evaporator is apt to frost. The staged frequency control refers to determining, according to a detected temperature, in each stage whether the detected reaches a set temperature of the stage and selecting frequency rising or frequency-down control. After the frequency rising of the variable-frequency compressor ends, if it is detected that the condenser temperature, the cylinder outlet temperature, or the evaporator is below a set value, the difference between the condenser temperature and the compressor discharge temperature is less than a set value, or the difference between the inlet and outlet temperatures of the evaporator is less than a set value, the variable-frequency compressor is controlled to reduce the frequency in stages. If the evaporator is still in a state of being apt to frost when the frequency is reduced to a set minimum running frequency H2, after a certain period of time, the variable-frequency compressor is controlled to stop running for a set period of time, and a frequency rising process of the compressor is then executed for running at the final frequency.

The staged frequency control refers to that the running frequency of the compressor is divided into a plurality of stages to establish correspondences with detected temperatures, where the higher the temperature is, the lower the running frequency is controlled to be, in each stage, whether the temperature reaches a set temperature corresponding to the stage is detected, and if the temperature reaches the set temperature corresponding to the stage, the frequency is adjusted and reduced according to the running frequency to enter a next stage; if the temperature does not reach the set temperature corresponding to the stage, the running frequency in the stage is adjusted to be equal to or larger than the frequency corresponding to the temperature in the stage; a minimum running frequency H22 is provided for the control frequency of the compressor, and the variable frequency is controlled to be equal to or larger than the minimum running frequency.

When the compressor raises the frequency to a final frequency H0, that is, reaches a set target rotation speed or reaches a highest rotation speed that meets a limit requirements, variable frequency control is entered. With regarding to the frequency regulation of the variable-frequency compressor at this time, the regulation is performed according to the cylinder intake temperature/the cylinder outlet temperature/the compressor discharge temperature/the evaporator temperature/the condenser temperature, or the regulation is performed according to a time from a previous frequency regulation. For example:

After the variable-frequency compressor is started and runs stably, if the temperature sensor senses that: (1) the condenser temperature is below a set value (for example, 30° C.); or (2) the cylinder outlet temperature is below a set value; or (3) the evaporator temperature is below 0° C.; or (4) the difference between the condenser temperature and the compressor discharge temperature is less than a value; or (5) the difference between the outlet and inlet temperatures of the evaporator is less than a value, where (1)/(2)/(3) indicates that frosting may occur to the evaporator and (4)/(5) indicates that the refrigerant is not fully evaporated, and there is liquid that is sucked into the compressor, the compressor runs and reduces a certain frequency 5 Hz, and for a certain period of time after the frequency regulation until the temperature sensor correctly indicates a state change, a next determining and regulation is performed until the state disappears, or the frequency of the compressor is reduced to a set frequency value H1, where H1 is a frequency at which the laundry dryer can slowly increase the temperature until the frosting of the evaporator is eliminated. If the above state still exists when the frequency is reduced to H1 and the duration of the state exceeds a set time T1, for example, 30 minutes, it indicates that the frosting of the evaporator is probably server, and in this case the variable-frequency compressor stops running for a time T2, 3 minutes at least, frost of the evaporator is melt by means of heat of the air circulated in the drum, and then the variable-frequency compressor restarts and runs, executes a frequency rising process, and then runs at the final frequency 60 Hz or the running frequency before the compressor is halted.

If the above state disappears and the condenser temperature is higher than the set value 30° C., a section control stage of the frequency of the compressor is entered. The running frequency is divided into a plurality of stages to establish correspondences with the condenser temperatures or the cylinder outlet temperatures. The high the condenser outlet temperature is, the lower the running frequency band is. In each frequency band, the actual running frequency is adjusted according to the condenser temperature/the compressor discharge temperature/the input current in the running of the compressor, so that the frequency may be less than the primary running frequency in the stage. The minimum running frequency in the stage of determining a minimum frequency of the compressor according to the amount of the clothes is set to be H2, where H2 is less than or equal to H1. If the situation in which the condenser temperature/the compressor discharge temperature/the input current exceeds a permit value, namely, a condenser temperature permit value TC1/a compressor discharge temperature permit value TD1/an input current permit value I1 appears in the compressor, where TC1>TC2>TC3, TD1>TD2>TD3, and I1>I2>I3, the compressor stops running for at least 3 minutes and then recovers the original frequency to run. For example, when the condenser temperature is increased to 32° C., the frequency is reduced from the target rotation speed 60 Hz to 50 Hz. When the condenser temperature is increased to 42° C., the frequency reduces from the rotation speed 50 Hz to 40 Hz. When the condenser temperature is increased to 47° C., the frequency is reduced from the rotation speed 40 Hz to 35 Hz if the minimum running frequency H2 of the compressor is set to be 35 Hz according to the determining of the amount of the clothes at the beginning; and the frequency is reduced from the rotation speed 40 Hz to 30 Hz if the minimum running frequency H2 of the compressor is set to be 30 Hz according to the determining of the amount of the clothes at the beginning, and the running is performed at 30 Hz until the drying ends. During running at 30 Hz in the last stage, along with the increase of the temperature in the barrel, the compressor running current I/the condenser temperature/the compressor discharge temperature may also reach a required limit value. For example, the condenser temperature is not higher than 70° C., and if the temperature is close to 70° C., according to usual control, the frequency is continuously reduced to reduce the condenser temperature. By using the control method of the present invention, at the final control stage, the frequency is no longer reduced after the compressor running current I, the condenser temperature, and/or the compressor discharge temperature reaches the limit even if the stage with the lowest frequency at which the compressor can run is not reached, and the load of the compressor is reduced by starting a fan (referring to FIG. 6). The process is not compulsory. The operation of the compressor can be well controlled if enough stages are set for the variable-frequency control for precise control. Such the compressor variable-frequency control method protects reliable running of the compressor, and further does not reduce condensing efficiency, thereby shortening the running time. Moreover, since a pressure difference between the condensing pressure and the evaporation pressure reduces along with the reduction of the running frequency, the evaporation pressure increases, and the evaporation temperature increases in the drying process, by purely dependent on reducing the frequency, the evaporator temperature increases due to the evaporation pressure, and the area of air that reaches an exposed point of the cylinder outlet diminishes, thereby reducing the condensing efficiency. The evaporator temperature may also be increased to a normal use range of the compressor. The controlled limit value of the condenser temperature may be a temperature limit value required by the compressor, or may also be a temperature value which is defined by a human, benefits the drying effect, and is lower than a temperature limit value required by the compressor.

Embodiment 8

Figure 6:
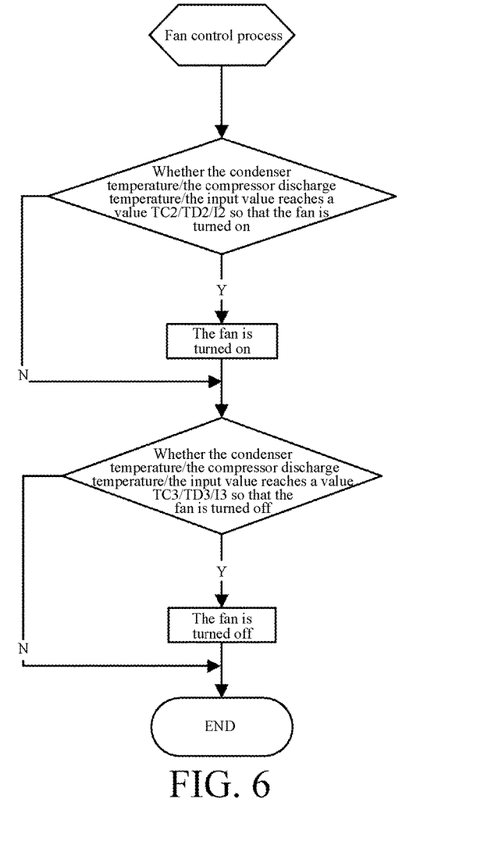
FIG. 6 is a schematic flowchart of the fan control according to one embodiment of the present invention.

In the fan control stage, as shown in FIG. 6, the same as a running process of an invariable-frequency compressor of the existing technology, it can be set that the fan runs when the condenser temperature/the compressor discharge temperature/the input current of the compressor exceeds a permit value TC2/TD2/I2; and the fan is turned off when the condenser temperature/the compressor discharge temperature/the input current of the compressor is below a permit value TC3/TD3/I3, where TC2>TC3, TD2>TD3, and I2>I3. Generally, it is selected that TC2 is not higher than 68° C., TC3 is (TC3−3) 65° C., TD2 is 105° C., and TD3 is 100° C.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A control method for a laundry dryer, the laundry dryer being a heat-pump type laundry dryer and a compressor being a variable-frequency compressor, comprising:
   setting a minimum running frequency of the compressor according to an amount of clothes to be dried, wherein the more the clothes are, the larger the set minimum running frequency is;
   detecting a primary weight of the clothes, at the beginning;
   detecting a weight of the clothes after drying, after working for a set period of time; and
   determining a change in the weight of the clothes per unit of time, wherein the smaller the change is, the more the clothes are, and the larger the set minimum running frequency of the compressor is.

2. The control method for the laundry dryer according to claim 1, comprising: after drying starts, detecting the amount of the clothes being dried, the minimum running frequency of the compressor corresponding to the detected information is set as the minimum running frequency of the compressor in the current drying process.

3. The control method for the laundry dryer according to claim 1, wherein for a different drying process selected, a set parameter thereof is different.

4. The control method for the laundry dryer according to claim 3, comprising: within a set range of drying time, determining a time for a condenser surface temperature to reach a set temperature value, wherein the longer the time is, the more the clothes are, or determining a change in a condenser surface temperature within a set period of time, wherein the smaller the change in the condenser surface temperature for per unit of time is, the more the clothes are, and the larger the set minimum running frequency of the compressor is.

5. The control method for the laundry dryer according to claim 3, comprising: within a set range of drying time, determining a time for humidity of the clothes in the laundry dryer to reach a set humidity value, wherein the longer the time is, the more the clothes are, or determining a change in humidity of the clothes within a set period of time, wherein the smaller the change in the humidity of the clothes, the more the clothes are, and the larger the set minimum running frequency of the compressor is.

6. The control method for the laundry dryer according to claim 3, comprising: within a set range of drying time, determining a different between a cylinder intake temperature and a cylinder outlet temperature of heated air of the laundry dryer, wherein the larger the difference is, the more the clothes are, and the larger the minimum running frequency of the compressor is.

7. The control method for the laundry dryer according to claim 1, wherein the laundry dryer provides two or more levels of clothes amount according to the amount of the clothes, and a different level of clothes amount is separately corresponding to a different minimum running frequency of the compressor.

8. The control method for the laundry dryer according to claim 1, wherein the laundry dryer regulates the frequency of the compressor according to a cylinder intake temperature and/or a cylinder outlet temperature, a temperature detected by one or more temperature sensors disposed on the compressor/an evaporator/a condenser, or a drying time.

9. The control method for the laundry dryer according to claim 8, wherein the frequency regulation of the compressor adopts staged control, comprising: dividing the running frequency of the compressor into a plurality of stages to establish correspondences with detected temperatures, wherein the higher the temperature is, the lower the running frequency is controlled to be, detecting, in each stage, whether the temperature reaches a set temperature corresponding to the stage, if the temperature reaches the set temperature corresponding to the stage, adjusting and reducing the frequency according to the running frequency to enter a next stage, if the temperature does not reach the set temperature corresponding to the stage, adjusting the running frequency in the stage to be equal to or larger than the frequency corresponding to the temperature in the stage, and controlling the variable frequency to be equal to or larger than the minimum running frequency.

* * * * *